SAW RESISTANT LOCK

BACKGROUND OF THE INVENTION

In enclosure type fences, as for example, fences formed of metal posts and steel mesh for enclosing a storage yard or truck or vehicle parking area or the like, it is conventional to provide a swinging gate which is usually locked closed with a chain and conventional lock. The combination of a metal chain and lock is additionally used to lock various types of gates as well as to lock articles, such as bicycles or the like, to fixed posts, etc. However, conventional chains and locks are relatively easy to break or cut using a saw or a heavy duty clipping device or the like. Thus, efforts have been made to provide chains and locks which are more saw resistant and more difficult to otherwise cut or break, but only with limited success. Hence, there has long been a need for a locking device to perform the function of a chain and conventional lock for locking gates, articles such as bicycles, etc., and which locking device is resistant to sawing or cutting or breaking by other tools.

Thus, the invention herein relates to a lock which may perform the function of a conventional chain and lock combination, that is, with a shackle which can encircle relatively large items, such as a portion of a fence or gate, etc., and a locking mechanism so formed as to resist normal cutting or breakage. Alternatively, locking pins or legs may be used instead of a unitary shackle. Such a lock thus completely eliminates the need for conventional chains and provides far better security than is currently available with conventional chain and lock combinations.

SUMMARY OF INVENTION

The invention herein contemplates a lock of a size and shape which can replace a conventional chain and lock combination, and which is formed of a large U-shaped shackle portion whose legs extend into holes formed in a base. A locking bolt concealed therein extends in overlapping relationship across the portions of the shackle legs contained within the base. The bolt is rotatable into a shackle engaging and locking position and into a second release position.

The bolt is supported within bushings, at its opposite ends, which bushings are completely concealed within the elongated base and with at least one of the bushings containing a simple, conventional key operated lock mechanism which is concealed and protected against tampering. Thus, the entire lock essentially comprises only six relatively simple and inexpensive parts, namely, an elongated bar-like base, the bent shackle, the bolt and a pair of bushings, and the conventional lock mechanism, all assembled together in such a manner as to conceal and to protect within the base all of the parts and the engagement points of the parts.

Alternatively, a pair of separate legs or pins, each fastened to one of the two members to be locked (i.e., a gate edge and post or adjacent edges of a pair of doors, etc.) may be utilized instead of a unitary shackle.

The shackle (or pins) and the bolt may be made of a saw resistant material such as that disclosed in the patent to Shwayder et al, U.S. Pat. No. 3,777,517, issued Dec. 11, 1973, and in Shwayder, U.S. Ser. No. 492,191, filed July 26, 1974, which is generally formed of a tube having a metal core fitted therein and with longitudinal spaces between the core and the interior of the tube wall, which spaces are filled with a matrix of hard particulate material such as tungsten carbide particles and a relatively soft binder, such as brazing compounds or the like. Thus, a closed loop of saw resistant material is formed. Such loop comprises the bent shackle portion which may encircle articles to be locked, or the pins, and the bolt which is concealed within the bar-like base. When formed of such material, the loop is virtually impossible to cut through or break through with normal available saws and cutting devices so that for all practical purposes it becomes tamper proof and break proof.

Because of its simplicity of design, the lock herein is relatively inexpensive and also is simple to operate and is resistant to jamming. Also, it permits the use of a simple and inexpensively constructed key operated lock mechanism of low strength, since the mechanism is completely concealed within and protected by the surrounding lock base in a way that it cannot be easily damaged.

These and other objects and advantages of this invention will become apparent upon reading the following description, of which the attached drawings form a part.

DESCRIPTION OF DRAWINGS

FIG. 8 illustrates the saw resistant closed loop formed of the shackle and the crossing bolt.

FIG. 9 and FIG. 10 illustrate enlarged perspective views of the blind end bushing and the open end, lock mechanism receiving, bushing, respectively.

FIGS. 11 and 12 are cross-sectional views of the two bushings.

FIG. 13 is a cross-sectional end view of the open end bushing taken in the direction of arrows 13—13 of FIG. 12.

FIG. 14 is an end view of the locking mechanism, and

FIG. 15 is an elevational view of the locking mechanism.

FIG. 16 is a perspective view of the locking mechanism.

FIG. 17 is a view of the locking mechanism arranged within the bushing (shown in cross-section).

FIG. 18 is an enlarged, cross-sectional view taken in the direction of arrows 18—18 of FIG. 8, showing the saw resistant material in cross-section.

FIG. 19 is a perspective view of a modification using separate pins or legs rather than a unitary shackle.

FIG. 20 is a plan view of the modification of FIG. 19.

FIG. 21 is a cross-sectional view taken on lines 21—21 of FIG. 20.

FIG. 22 is a cross-sectional view taken on lines 22—22 of FIG. 19.

ANTI-THEFT CAP FOR A SCREWTHREADED BASE

The present invention relates to an anti-theft cap for a screwthreaded base, in particular for the fuel tank of a vehicle.

Such caps are known which comprise a plate having a tapped bore which is complementary to the screwthreaded portion of the base, a body journalled on said plate, in which body a lock is mounted, said lock carrying a catch which, for one position of the lock, is at a distance from the axis of the cap equal to the distance of a stop integral with said plate, and, for at least one other position of the lock, is at a different distance.

The actuation of the lock, which can only be achieved with its key, brings the catch to its second position in which, upon rotation of the body with respect to the plate in the screwing direction, the catch encounters the stop which is in its path. Thenceforth, the body and the plate are inter-connected to rotate in the screwing direction and the cap can be screwed on the base. After this screwing, the user actuates the lock to bring the catch to its first position and the interconnection between the body and the plate is eliminated so that the cap can no longer be unscrewed. For the unscrewing, the procedure is the same, but in the unscrewing direction.

However, these known caps have the drawback that the user is liable to screw the cap too tightly on the base, which renders the unscrewing difficult and damages the screwthreads and/or the stops.

An object of the invention is to overcome these drawbacks of known caps by means of a tightening torque limiter.

According to the invention, there is provided a cap wherein said stop is elastically movable and arranged to move under the action of the catch when the screwing torque transmitted by the catch exceeds a given value.

In one embodiment of the invention, said stop is rotatable about an axis parallel to the axis of the cap and returned elastically to its stop position, the travel of said stop being limited in one direction of rotation by an abutment integral with said plate. This limitation of the rotational travel of the stop permits preventing its rotation for unscrewing. In this case, it is advantageous to arrange that said stop is constituted by an arm of a pivoted lever whose other arm is elastically deformable.

In a modification, the stop is movable in translation substantionally in the radial direction against the action of elastic means, and has a curved profile, which cooperates with said catch so as to move the stop for one direction of rotation of the body, and a substantially radial second profile.

Figure 1:
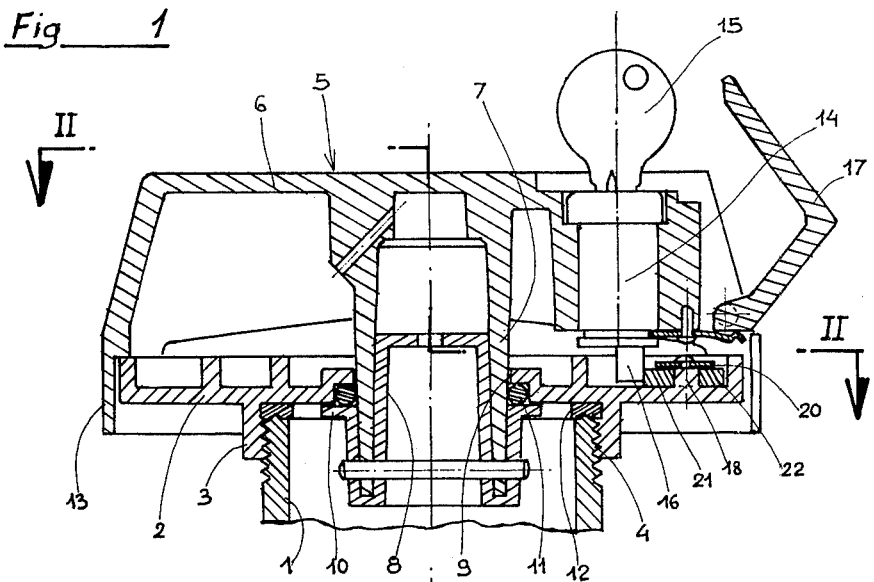
FIG. 1 illustrates the lock herein utilized to lock together a pair of adjacent swinging fence gates.
Figure 2:
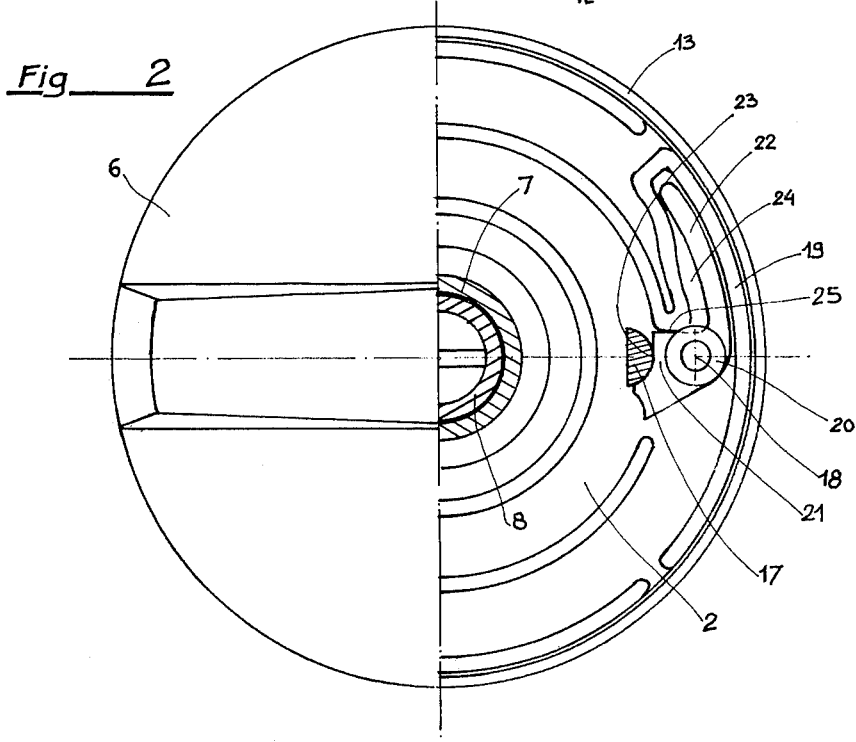
FIG. 2 is an enlarged perspective view showing the lock in its closed position and showing, in dotted lines, the open position.
Figure 3:
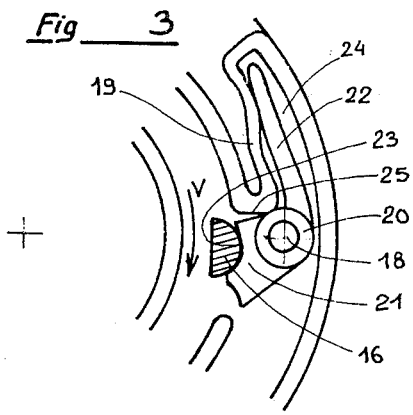
FIG. 3 is a cross-sectional plan view taken in the direction of arrows 3—3 of FIG. 4.
Figure 7:
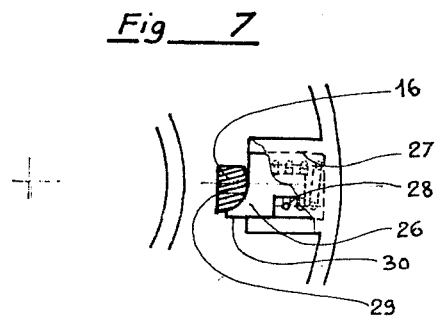
FIG. 7 is a perspective, exploded view, showing the parts disassembled.

An understanding of the invention will be had from the ensuing description with reference to the accompanying drawings in which:

FIG. 1 is an axial sectional view of a cap according to one embodiment of the invention;

FIG. 2 is a sectional view taken on line II—II of FIG. 1;

FIGS. 3 to 6 are views of a detail of the cap shown in FIG. 2 in respect of various positions, and FIG. 7 is similar to FIG. 3 in respect of a modification.

With reference first to FIGS. 1 and 2, the cap, adapted to be screwed onto a screwthreaded base 1, comprises a plate 2 provided with a flange 3 defining a tapped aperture 4 which is complementary to the screwthread of the base 1. The body 5 of the cap is constituted by a cup 6 having a centre depending portion 7 which is pinned to a hub 8. The hub 8 and the depending portion 7 extend through a centre aperture 9 of the plate 2, the hub 8 having a radial flange 10 which is rotatable on the plate 2 with interposition of a ring 11. The plate 2 carries a sealing element 12 cooperating with the edge of the base 1. The outer peripheral edge 13 of the cap 6 overlaps the periphery of the plate 2 so that, when the cap is in position on the base 1, this base is inaccessible.

A barrel-type lock 14, actuated by a key 15, is mounted in an eccentric position in the cup 6. The barrel of the lock 14 is extended, at the end thereof opposed to the key, by a substantially semi-cylindrical catch 16. A pivotable cover 17 is adapted to close the opening for the key in the lock 14.

The plate 2 carries a pin 18 on which there is pivotably mounted a cranked lever 19 retained by a washer 20. The lever 19 is of plastics material and has a substantially radial short rigid arm 21 and flexible elongated arm 22 which is substantially perpendicular to the arm 21. The arm 21 has a curved profile 23 adapted to cooperate with the curved portion of the catch 16. The arm 22 is disposed in a recess 24 which limits the movements of the arm 22 and has an edge 25 adjacent the arm 21 which acts as an abutment for the latter.

The cap operates in the following manner:

Having brought the lock to the open position by means of the key, the catch 16 is at the same distance from the axis of the cap as the profile 23 of the arm 21. Upon rotating the cup 6 in the direction of arrow V (FIG. 3), the catch 16 engages in the profile 23 and interconnects the cup 6 and the plate 2 for rotation in the screwing direction of arrow V. The cap can now be screwed onto the base 1.

Figure 4:
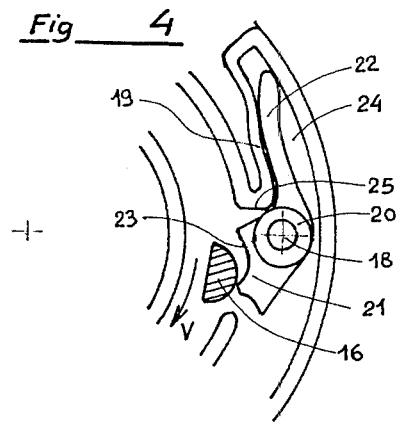
FIG. 4 is a partially cross-sectioned elevational view of the lock showing the shackle in lock position.
Figure 5:
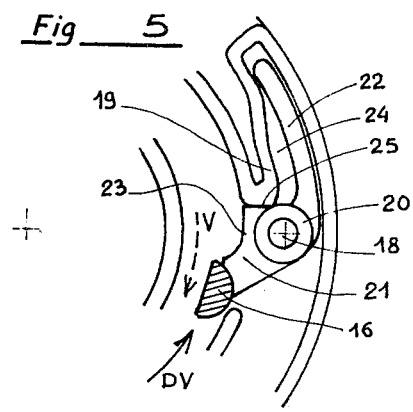
FIG. 5 and FIG. 6 are cross-sectional end views taken in the direction of arrows 6—6 showing the bolt in the unlocking position and in the locking position, respectively.
Figure 6:
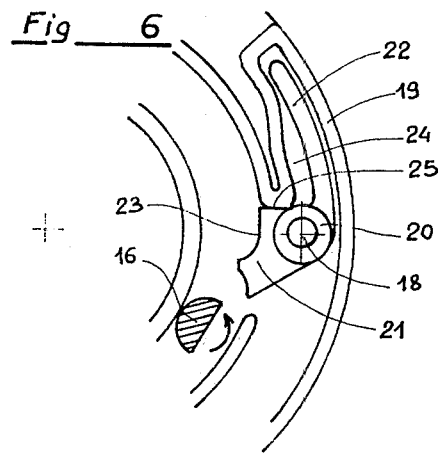

As soon as the screwing is sufficient, the resistant torque resulting from friction between the tapped aperture 4 of the plate 2 and the screwthreaded base 1 increases. This resistant torque is transmitted to the arm 21 by the catch 16 and converted into a pivotal torque about the pin 18. The arm 21 starts to pivot about this pin (FIG. 3), with the arm 22 bearing against the wall of the recess 24 and deforming elastically. For a value of the resisting torque which depends on the rating of the elasticity of the arm 22, the catch 16 escapes from the profile 23 of the arm 21 (FIG. 4). The cup 6 is released from the plate 2 and the screwing of the plate 2 ceases. If the user, after having caused the cup 6 to turn through a complete revolution, returns the catch 6 in front of the arm 21, the lever arm 19 having meanwhile resumed its initial shape, this arm 21 will again move away as before without producing additional screwing of the plate 2.

If the user turns the cup in the unscrewing direction (arrow DV, FIG. 5) the catch 16 comes in contact with the arm 21 of the lever 19, which cannot pivot about the shaft 18, since it encounters the edge 25 of the recess 24. The plate 2 and the body 5 are therefore interconnected to rotate in the direction of arrow DV and the cap is unscrewed.

When the user brings the lock to the closing position (FIG. 6) and withdraws the key, the cap can no longer be unscrewed since the catch 16 has rotated through half a revolution and no longer encounters the arm 21 of the lever 19 when the body 5 is turned with respect to the plate 2, so that this body 5 is freely rotatable with respect to the plate.

With reference now to the modification shown in FIG. 7, the lever 19 is replaced by a slidable stop 26 guided in a cavity 27 and biased outwardly of the cavity by a coil spring 28. The stop 26 has a curved profile 29 cooperable with the catch 16 to produce the retraction of the stop in the screwing direction for a given resistant torque. The stop 26 has a radial profile 30 which precludes any movement when the catch 16 encounters it in rotating in the unscrewing direction DV.

What is claimed is:

1. An anti-theft cap for a container having a screw threaded opening comprising a screw threaded closure member for cooperation with said screw threaded opening, stop means on said closure member, a cap member secured to and rotatable about said closure member, a lock fixedly connected to said cap member and including a catch element movable, upon operation of said lock, between a first and a second position, said catch element in said first position engaging said stop means and in said second position being disengaged from said stop means, rotation of said cap member with said catch in said first position imparting torque to said closure member and said cap member being freely rotatable on said closure member with said catch in said second position, said stop means comprising a pivoted lever elastically deflectable out of engagement with said catch element upon the application of a torque greater than a predetermined limit upon rotation of said cap member in one direction and abutment means on said closure member engaging said lever and preventing deflection of said lever upon rotation of said cap member in the opposite direction, and wherein said lever is a bell crank lever, one limb of which is substantially rigid and engages said catch element and the other limb of which is elastically deformable.

2. A cap as claimed in claim 1 wherein said lever is pivoted about an axis substantially parallel to the axis of said screw threaded closure member.

* * * * *